US012195311B2

(12) United States Patent
Brinkmann et al.

(10) Patent No.: US 12,195,311 B2
(45) Date of Patent: Jan. 14, 2025

(54) FLUID-OPERATED LIFTING GEAR

(71) Applicant: J. D. Neuhaus Holding GmbH & Co. KG, Witten (DE)

(72) Inventors: Jörg Brinkmann, Hagen (DE); Simon Brose, Hattingen (DE); Piotr Krupnik, Iserlohn (DE)

(73) Assignee: J. D. Neuhaus Holding GmbH & Co. KG, Witten, DE (US)

( * ) Notice: Subject to any disclaimer, the term of this patent is extended or adjusted under 35 U.S.C. 154(b) by 208 days.

(21) Appl. No.: 17/637,366

(22) PCT Filed: Aug. 24, 2020

(86) PCT No.: PCT/EP2020/073657
§ 371 (c)(1),
(2) Date: Feb. 22, 2022

(87) PCT Pub. No.: WO2021/037810
PCT Pub. Date: Mar. 4, 2021

(65) Prior Publication Data

US 2022/0281724 A1 Sep. 8, 2022

(30) Foreign Application Priority Data

Aug. 27, 2019 (DE) ..................... 10 2019 122 956.1

(51) Int. Cl.
*B66D 1/08* (2006.01)

(52) U.S. Cl.
CPC ..................................... *B66D 1/08* (2013.01)

(58) Field of Classification Search
CPC ............... B66D 1/08; B66D 1/44; B66D 3/18
See application file for complete search history.

(56) References Cited

U.S. PATENT DOCUMENTS 3,933,388 A 1/1976 Conboy
7,195,296 B2 3/2007 Swift
2012/0082536 A1 * 4/2012 Kawashima .......... E02F 9/2075
180/65.265

(Continued)

FOREIGN PATENT DOCUMENTS

CN 107420384 A * 12/2017 ............ B66C 13/20
CN 107986179 A * 5/2018

(Continued)

OTHER PUBLICATIONS

International Search Report in International Patent Application No. PCT/EP2020/073657, mailed Dec. 7, 2020 (6 pages).

(Continued)

*Primary Examiner* — Jonathan R Matthias
(74) *Attorney, Agent, or Firm* — Ice Miller LLP; Justin D. Swindells

(57) ABSTRACT

A fluid-operated hoist and method for operating a fluid-operated hoist. The hoist is particularly convenient to produce and install and can be permanently and reliably operated without frequent maintenance. The hoist includes a fluid supply line supplying an operating fluid to the hoist for operating the hoist, a generator connected to the fluid supply line for generating electricity by the operating fluid, and an electrical consumer on the hoist that is operated by the electricity generated by the generator.

16 Claims, 1 Drawing Sheet

(56) References Cited

U.S. PATENT DOCUMENTS

| | | | | |
|---|---|---|---|---|
| 2013/0125540 | A1* | 5/2013 | Vainonen | F15B 15/00 60/413 |
| 2013/0327206 | A1 | 12/2013 | Rafalski, Jr. | |
| 2015/0203335 | A1* | 7/2015 | Dorzbach | B66C 13/18 212/276 |
| 2018/0050776 | A1 | 2/2018 | Schunder et al. | |
| 2019/0077641 | A1 | 3/2019 | Stensland | |

FOREIGN PATENT DOCUMENTS

| | | | |
|---|---|---|---|
| DE | 35 20 899 | A1 | 1/1986 |
| DE | 102004051094 | A1 | 4/2006 |
| EP | 2 660 183 | A1 | 11/2003 |
| JP | 5133453 | A | 3/1976 |
| JP | H08-290897 | A | 11/1996 |
| JP | 2005-133627 | A | 5/2005 |
| JP | 2007-50962 | A | 3/2007 |
| NL | 2014838 | A * | 11/2016 |
| NO | 20160714 | A1 | 1/2017 |
| WO | WO 2017/111684 | A1 | 6/2017 |

OTHER PUBLICATIONS

D2 International Preliminary Report on Patentability in International Patent Application No. PCT/EP2020/073657, mailed Mar. 1, 2022 (7 pages).

* cited by examiner

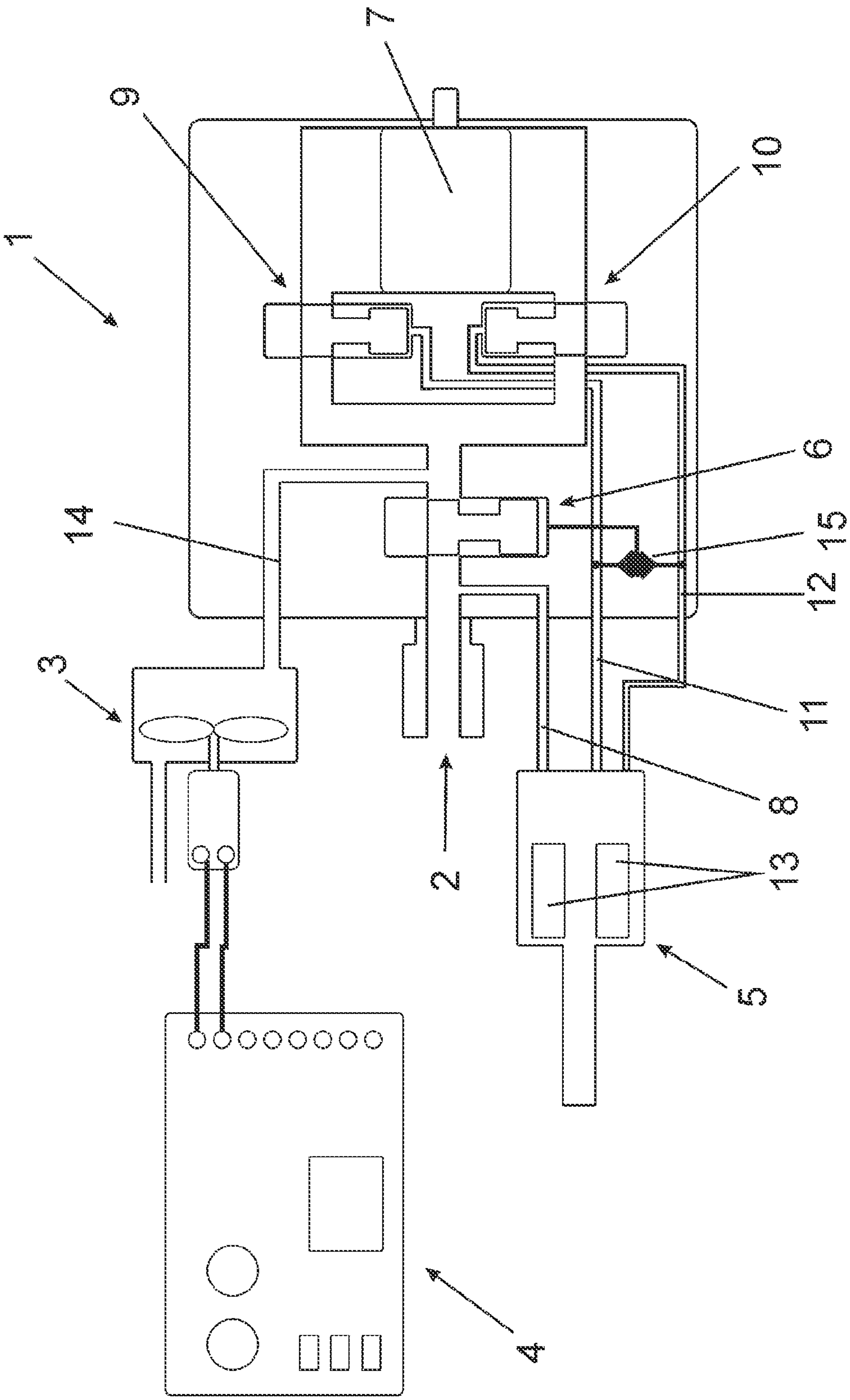
1
2
3
4
5
6
7
8
9
10
11
12
13
14
15

FLUID-OPERATED LIFTING GEAR

CROSS-REFERENCE TO RELATED APPLICATIONS

This application is a U.S. National Stage of International Application No. PCT/EP2020/073657, filed Aug. 24, 2020, which claims the benefit of Germany Patent Application No. 10 2019 122 956.1, filed Aug. 27, 2019, both of which are incorporated herein by reference in their entireties.

The invention relates to a fluid- or compressed air-operated hoist and a method for operating a fluid- or compressed air-operated hoist.

Hoists are known from the prior art in a variety of embodiments and are used in particular for suspended lifting and moving of loads. For this purpose, the load is usually fixed to a chain, a rope or the like by means of a hook or other fastener and the chain or rope is moved by means of a drive. The drive comprises a motor, usually a gearbox, and other components. In a fluid-operated hoist, the motor is hydraulically or pneumatically driven, such that no power supply to the hoist is required for the drive.

A hand control unit is typically provided to control the hoist, which in the case of a fluid-operated hoist is typically also fluid-operated and connected to the hoist via fluid lines. An advantage of these hoists is that only a supply of the operating fluid, but no electrical connection, is required for operating the hoist. However, a significant disadvantage of these purely fluid-operated hoists is that operation of an electrical consumer, such as a control and/or evaluation unit, is not readily possible.

In addition, hoists are known that are operated with a wireless remote control. However, even in the case of a hoist that is operated exclusively pneumatically, a power supply unit must then be connected throughout to supply the receiver of the wireless remote control and/or of a control and/or evaluation unit in the region of the hoist.

However, due to the typical positioning of the hoist in an elevated position, for example at a hall ceiling, it is difficult to provide an appropriate power supply, in particular when retrofitting an existing fluid-operated hoist, as usually no power supply is provided in the region of the hoist. The additional effort of wiring makes the installation of such a hoist very complex and expensive and, moreover, the required power supply unit also increases the price of the hoist not insignificantly.

Finally, such an electrical consumer of a fluid-operated hoist can also be supplied with electricity by means of a battery, which, however, has to be replaced regularly, which is costly and dangerous due to the usual installation situation of a hoist, typically in the region of a hall ceiling.

It may be understood as an objective to provide a fluid-operated hoist as well as a method for operating a fluid-operated hoist, wherein the hoist is particularly convenient to produce and install and can be operated continuously and reliably without frequent maintenance, and with at least one electrical consumer on the hoist.

The objective is solved according to the invention by a fluid-operated hoist according to claim 1 and by a method for operating a fluid-operated hoist according to claim 9. Advantageous developments of the invention are given in the dependent claims.

The fluid- or compressed air-operated hoist for lifting loads according to the invention comprises a fluid supply line for feeding an operating fluid to the hoist, a compressed air generator connected to the fluid supply line for generating electricity by means of the operating fluid, and at least one electrical consumer on the hoist which is operated by means of the electricity generated by the compressed air generator.

The method according to the invention for operating a fluid- or compressed air-operated hoist has method steps of first supplying an operating fluid via a fluid supply line to the hoist, followed by supplying the operating fluid to a compressed air generator of the hoist and generating electricity by means of the operating fluid. The electricity generated is then fed to at least one electrical consumer of the hoist.

The inventors have recognized that a compressed air generator provides, in a simple manner, a permanent power supply to the at least one consumer during operation of the hoist without a need for an external power supply or regular charging of an operating accumulator. As a result, the hoist can be operated with little maintenance and can be easily installed in any location where merely conduits for the operating fluid are available.

A fluid- or compressed air-operated hoist is basically a hoist for lifting loads, in which at least the drive unit provided for lifting and/or lowering the load, in particular a motor, is driven by means of the operating fluid. The hoist is preferably operated exclusively by means of the operating fluid and is particularly preferably a compressed air hoist. However, a design as a hydraulic hoist is also conceivable in principle. Also preferably, the hoist has no external electrical connection and/or requires no external power supply for operating.

The motor of the hoist can basically be any fluid motor. Preferably, it is an expansion motor and particularly preferably a gas expansion motor. Most preferably, the motor is a vane motor. In particular, it is further preferred that the vane motor is provided for driving the hoist and, in particular, a chain of the hoist. In this context, however, the motor may not only be a pneumatic motor, but may in principle also be operated by means of a fluid, i.e hydraulically. This can, for example, be a gear motor.

The operating fluid can basically be any liquid or any gas. Although operation with a hydraulic operating fluid, in particular with hydraulic oil, is conceivable, purely pneumatic operation with any gas, for example air, nitrogen or a gas mixture, is preferred. According to the invention, the operating fluid is compressed air. Likewise, the pressure of the operating fluid can initially be selected as desired. Preferably, the pressure of the operating fluid supplied to the hoist is between 0 bar and 10 bar, more preferably at a maximum of 6 bar and most preferably is exactly 6 bar, so that a constant pressure of about 6 bar is applied to the fluid supply line supplying the operating fluid.

The fluid supply line feeding the operating fluid to the hoist can be any component or assembly suitable for permanently holding and/or conducting a pressurized operating fluid. In principle, the fluid supply line can be a component independent of the hoist and connected thereto. However, preferably, at least a short section of the fluid supply line is securely installed on the hoist and, particularly preferably, this short section is provided for implementing a connection for a fixed compressed air line or compressed air hose.

Primarily, the compressed air generator can be any device that can generate electricity without having to be connected to an electrical line or external power supply. Both a movement, and the pressure, of the operating fluid can be used for generating electricity. In addition, another physical quantity, such as a temperature difference or a force effect in the region of the hoist and/or a component of the hoist, for example a rotating axle, can also be used for generating electricity. Still more preferably, the electricity is generated exclusively by means of the operating fluid, which means that a property of the operating fluid in the generator is used to generate electricity, for example the pressure, the flow or movement, the temperature or vibrations or pressure fluctuations.

According to the invention, the generator is arranged at the hoist and/or is connected to the fluid supply line. Arranged at the hoist means that the generator is positioned or disposed at least in the immediate vicinity of the hoist, preferably directly connected to the hoist, and still more preferably, at or in a control box in the region of the hoist. Also preferably, the generator is arranged in the region of the hoist between a connection of the hoist for an external fluid supply line and the external fluid supply line. However, it is possible in principle that further components of the hoist, for example one or more valves and in particular a main switch valve, are disposed between an external fluid supply line and the fluid supply line or between the fluid supply line and the generator. In particular, it is further preferred that the generator is directly connected to the fluid supply line, in particular such that the fluid pressure is applied to the generator as soon as the fluid supply line and/or an external fluid supply line is pressurized. In addition, however, it is particularly preferred that no valve and, very preferably, generally no component is disposed between the internal and/or external fluid supply line and the generator.

According to the invention, an operating fluid is first supplied to the hoist via a fluid supply line, followed in time and/or space by supplying the operating fluid to a generator of the hoist. Initially, this simply means that a pressurized operating fluid is applied to the hoist or in the region of the hoist so that the hoist and/or the generator can be operated. The sequence can be such that the operating fluid in the fluid supply line is conducted or branched off to the generator via a control valve upstream of the hoist, preferably immediately or directly upstream of the hoist, and only then is the operating fluid conducted into the hoist. However, there can also be a connection on the hoist from which the operating fluid can first be branched off to the generator inside the hoist and only then does the operating fluid reach the drive of the hoist and, for this purpose, particularly preferably is then present upstream of a control valve block of the hoist. Particularly preferably, the branch for the generator fluid, or the branch for the operating fluid leading to the generator, is located upstream of a control valve and/or downstream of a main connection valve of the hoist in order to ensure that the generator can always be supplied with the operating fluid for generating electricity when the hoist is under pressure, irrespective of the operating state of the hoist. Alternatively, however, it is also conceivable to arrange a branch for the generator fluid at the exhaust, downstream of the pneumatic hoist motor and/or directly at or upstream of the outlet of the operating fluid from the hoist.

According to the invention, at least one electrical consumer is arranged at the hoist, wherein the hoist can also have multiple electrical consumers. Preferably, all electrical consumers of the hoist are operated exclusively by means of the electricity generated by the generator. In this case, the electricity required for operating the at least one consumer can be generated directly by the generator. Preferably, all electrical consumers are electrically connected exclusively to the generator and/or further components of the hoist. Preferably, at least one consumer and particularly preferably all consumers are arranged directly at the hoist and/or on a control unit of the hoist.

The consumer or consumers can be any electrically operated and/or electronic components. In particular, at least one of the consumers is an electronic control component and/or a sensor, in particular a sensor for the rotational speed, for a load measurement, for measuring vibrations, the temperature, the fluid pressure or other physical quantities. Furthermore, at least one of the consumers can also be a communication module for data transmission, for example by means of a modem, WLAN, Bluetooth, wireless, radio or in some other way. Particularly preferably, such a communication module thereby provides a web interface. In addition, at least one of the consumers can be a GPS module or a tracking module in order to capture and, if necessary, also transmit the position of the hoist.

In a preferred embodiment of the fluid- or compressed air-operated hoist according to the invention, at least one, preferably exactly one, of the electrical consumers is a receiver unit of a wireless remote control of the hoist, an electronic control unit, an operating hour counter and/or an evaluation unit for determining operating states of the hoist. In general, an electrical consumer can also comprise or be any sensor for capturing physical quantities, so that, particularly preferably, information about the hoist and, in particular, about the operating state can be derived and/or obtained by means of the sensor data. Preferably, the electronic consumer is arranged directly at the hoist. A control unit is preferably disposed for controlling the hoist and particularly preferably for controlling at least one valve for the operating fluid, most preferably for controlling all valves for the operating fluid of the hoist. In addition, the control unit can control other functions and/or actuators of the hoist. An evaluation unit can be connected to any sensors and/or capture any signals or data relating to an operating state and/or fault condition of a hoist. In particular, a control and/or evaluation unit can be connected to one or more sensors, in particular to pressure sensors. Finally, an operating hour counter is preferably provided at least for capturing the operating duration and, particularly preferably, also the duration of individual operating states.

Another preferred embodiment of the fluid- or compressed air-operated hoist according to the invention comprises an accumulator for storing the electricity generated by means of the generator and/or for operating at least one electrical consumer while the generator is not generating electricity. Such an accumulator advantageously allows buffering and/or storing of the generated electricity, so that no continuous operating fluid pressure is necessary for operating the consumer or the consumer can also be used if the operating fluid supply to the hoist is interrupted at least for a short time. By means of an accumulator, downtimes of the hoist, in particular without operating fluid supply, can thus be bridged in a simple manner on the control side. The accumulator is thus preferably used as a temporary power storage. Instead of an accumulator or in addition, at least one capacitor can also be provided as a buffer and/or as an power storage, although a version comprising at least one accumulator is preferred, since longer-term storage is possible and a higher storage capacity is available. In addition, an accumulator or a battery can also be provided, for example, for operating a real-time clock, in particular with an operating hour counter as a consumer, wherein a compact long-life battery or a ten-year battery, in particular on a printed circuit board, is particularly preferred as a battery. Alternatively, an accumulator or a battery is also advantageous for permanently operating at least one sensor and/or one control element.

In accordance with an advantageous development of the fluid- or compressed air-operated hoist according to the invention, the generator for generating the electricity is a compressed-air generator, which is preferably connected at least indirectly, particularly preferably directly, to the fluid supply line of a pneumatically operated hoist, whereby electricity can be generated particularly efficiently and reliably by means of the pressurized operating fluid, in particular by means of compressed air. In this context, the compressed-air generator preferably requires only an applied gas pressure for operating and thus functions independently of the operation of the hoist. Particularly preferably, the compressed-air generator has a gas turbine or another component that can be rotated by flowing air, wherein a generator part is disposed downstream such that electricity is generated by the rotation of the turbine or the component. In principle, however, any other rotating component of the hoist can be used to drive the generator.

A preferred development of the fluid- or compressed air-operated hoist according to the invention is formed in such a way that at least one of the electrical consumers on the hoist is an electronic or an electro-pneumatic control of the hoist, which preferably controls at least one valve, in particular all valves, of the hoist. Additionally or alternatively, a wired hand control for operating at least one electro-pneumatic valve of the hoist is also preferably disposed on the hoist, wherein the electro-pneumatic valve is particularly preferably provided with electricity by the generator and/or operated by means of an electro-pneumatic control. Particularly preferably, the hoist comprises exclusively electro-pneumatic valves. Further preferably, the electro-pneumatic control and/or at least one electro-pneumatic valve, particularly preferably all electro-pneumatic valves and very particularly preferably all valves of the hoist in in total are provided with electricity by the generator. In this context, an electro-pneumatic valve is a valve that is electrically actuated and/or operated and is provided to shut off a pneumatic line. Alternatively, an electro-hydraulic valve and a corresponding control can also be used in principle.

The wired hand control is also preferably supplied with electricity entirely from the generator. In particular, the hand control, and particularly preferably the entire hoist, has no external power supply. Furthermore, the hand control may have an accumulator as a buffer storage. In principle, however, the hand control can also have a power supply connection, in particular to charge an accumulator of the hand control or of the hoist and/or to facilitate start-up after a long interruption in operation, in particular of several weeks.

An alternative, preferred embodiment of the fluid- or compressed air-operated hoist does not have a wired hand control, but rather a pneumatic hand control, to which fluid pressure is preferably permanently applied in the ready-for-operation state of the hoist, wherein, particularly preferably a main switch valve of the fluid supply line can be opened by means of the hand control, such that the operating fluid is supplied to the generator for generating electricity and/or to a motor, in particular a vane motor, of the hoist.

An advantageous embodiment of the fluid- or compressed air-operated hoist provides that a main switch valve and/or a fluid pressure sensor are arranged between the fluid supply line and the generator connected to the fluid supply line. Here, the main switch valve is preferably provided for disconnecting the generator from the fluid supply line, wherein particularly preferably the hoist is not simultaneously disconnected from the fluid supply line. A pressure sensor is preferably arranged upstream of the main switch valve and/or the generator is preferably disposed downstream of the main switch valve. In principle, the generator can also be used as a fluid pressure sensor, since electricity is generated whenever a pressure is present and, particularly preferably, the pressure applied can be quantitatively determined based on the current intensity.

Such a design of the fluid- or compressed air-operated hoist has the advantage that electricity is generated whenever it is needed, whereby no electricity is generated when the hoist is not in operation. Moreover, there is also no need for a component of the control system, in particular a "watchdog" that constantly queries whether the hoist has been started in order to then subsequently start further routines or algorithms. Instead, the start of the electrical consumers and in particular of electronic components always occurs simultaneously with the opening of the main switch valve and/or simultaneously with the supply of the motor in the operating fluid.

Finally, a preferred development of the fluid- or compressed air-operated hoist provides that the generator and the motor of the hoist are connected to the fluid supply line in parallel with and/or inseparably from each other, particularly preferably with the main switch valve disposed between a fluid control line for hand control and the generator and/or the motor of the hoist.

A possible embodiment of the method according to the invention for operating a fluid- or compressed air-operated hoist provides that the generator continuously generates electricity as soon as and/or as long as operating fluid is supplied to the hoist or an operating fluid pressure is applied to the hoist and/or at the motor of the hoist. Thus, advantageously, electricity is generated automatically whenever the hoist is ready for operation and/or in operation. Accordingly, in this embodiment, the generator runs continuously, at least during operation of the hoist. Furthermore, it is preferred that when a main switch valve arranged between the fluid supply line and the motor of the hoist is opened, the generator is automatically supplied with operating fluid such that electricity is generated for electrical consumers.

In an alternative embodiment of the method according to the invention for operating a fluid- or compressed air-operated hoist, a check is carried out when an operating fluid pressure is present to determine whether at least one consumer is active and/or whether electricity is required for charging an accumulator or for operating at least one consumer, wherein disconnecting the generator from the fluid supply line by means of a main switch valve when no electricity is required is preferred, thereby advantageously avoiding the generator being active when no electricity is required. In this regard, the check may take place continuously or periodically. Preferably, the check is started by turning on the operating fluid pressure, which is particularly preferably detected by means of a pressure sensor or the start of power generation by the generator. Alternatively or in addition, the check is performed by means of an electronic control device, which is particularly preferably arranged at the hoist and/or supplied with power by means of the generator. Very particularly preferably, the control device is additionally supplied with power from an accumulator in order to be able to be operated independently of the operation of the generator.

According to an advantageous development of the method for operating a fluid- or compressed air-operated hoist, when pressing an actuation button, in particular any actuation button, on a pneumatic hand control, the main switch valve is opened and/or the generator is supplied with operating fluid, such that the hoist is activated and/or at least one electrical consumer, particularly preferably all electrical consumers, are started.

Especially preferred is an advantageous development of the method according to the invention for operating a fluid- or compressed air-operated hoist in which, after opening of the main valve upstream of a motor control valve for lifting or lowering by means of the hoist, a fluid pressure continuously builds up while the generator is already supplied with operating fluid, wherein preferably an electrical consumer, in particular a control unit, is fully started until the fluid pressure is sufficiently high to open the motor control valve. This results in a time delay between a first actuation of an actuation button and the starting of the motor of the hoist, which is, however, preferably shorter than 1 s, particularly preferably shorter than 0.5 s and most preferably shorter than 200 ms and in particular preferably less than 100 ms. Within this time, the electrical consumer can start and reach a fully ready-for-operation state, such that hoist fully ready for operation is then available.

However, if the motor has started before an electrical consumer, in particular the control unit and/or the operating hour counter, is fully started or ready for operation, a control unit and/or an operating hour counter of a particularly preferred development of the invention interpolates the starting time on the basis of the current rotational speed of the starting motor of the hoist, such that complete capture of the operating state is possible even if there is a slight delay in the start of one or more electrical consumers.

According to an advantageous embodiment of the method according to the invention for operating a fluid- or compressed air-operated hoist, at least one electrical consumer, in particular an electronic control unit and/or an operating hour counter and/or an evaluation unit for determining operating states of the hoist, is started as soon as the generator generates electricity, wherein preferably a control unit, in particular a voltage limiter, is provided which starts the respective electrical consumer only when the electricity required for this purpose is available, such that faulty starting or a breakdown of the electricity supply can be successfully avoided.

Finally, an embodiment of the method for operating a fluid- or compressed air-operated hoist is preferred in which, if no operating fluid pressure is applied, after a set time interval at least some of the electrical consumers, preferably all electrical consumers, are made to enter at least a standby state and, particularly preferably, are switched off completely and/or preferably a main switch valve disposed between the operating fluid supply line and the generator is also closed. The main switch valve can in principle also be formed in such a way that it closes automatically when the operating fluid pressure drops or is not applied, for which purpose the main switch valve is particularly preferably spring-loaded. In this case, the set time interval can in principle be freely selected, whereby it is preferably between one hour and one week, particularly preferably between six hours and two days, very preferably between 12 hours and 36 hours, and especially preferably about 24 hours. Alternatively, the set time interval can be very short, such that a switch-off occurs after a few minutes, after a few seconds or even immediately. Opening the main switch valve, however, results in an immediate power supply or a power supply that takes place with only a slight time delay as soon as an operating fluid pressure is applied, by which the at least one consumer, particularly preferably all consumers, are reactivated. In addition, such a small time delay can be taken into account and, if necessary, captured operating parameters can be back-interpolated for this purpose, for example, to the actual start time.

An exemplary embodiment of a fluid- or compressed air-operated hoist and a method for operating such a hoist are subsequently described in more detail with reference to the drawing. Shown in the FIGURE:

FIG. 1 schematic of a fluid- or compressed air-operated hoist with a motor and a generator for generating electricity.

A pneumatically operated hoist 1 is arranged at a hall ceiling for lifting and lowering loads by means of a hook on a chain. The hoist 1 comprises a pneumatic vane motor 7 as drive. Accordingly, the hoist 1 is connected to at least one compressed air line at the hall ceiling, wherein the compressed air line is connected to a compressed air supply line 2 of the hoist 1. There is no electrical connection, since a pneumatically operated hoist 1 usually does not require a power supply.

For operation by a user, the hoist 1 comprises a hand control 5 by means of which the lowering and lifting of a load on the hook of the chain can be controlled. For this purpose, the hand control 5 comprises at least one actuation button 13. Furthermore, the control functions preferably also include a displacement of the hoist 1 in at least one, preferably two, spatial directions. The pneumatic hand control 5 is thereby connected, on the one hand, via a fluid control line 8 to the compressed air supply line 2 and on the other hand, via a respective control line 11, 12 to a switching valve 9, 10, wherein the one switching valve 9 is provided for lifting a load by means of the hoist 1 and the other switching valve 10 is provided for lowering the load. Each switching valve 9, 10 can be operated in this case by means of an actuation button 13 on the pneumatic hand control 5. The pneumatic hand control 5, on the other hand, has no electrical connection with the hoist 1 or any other electrical consumer 4.

Furthermore, the hoist 1 comprises an electronic control as an electrical consumer 4, which is supplied with electricity by a compressed-air generator 3, which is arranged at the compressed-air supply line 2 in the region of the hoist 1 and generates electricity as long as compressed air flows through the compressed-air generator 3. Furthermore, an electronic evaluation unit and/or an operating hour counter can also be provided additionally or alternatively as an electrical consumer 4.

In order to avoid continuous operation of the compressed air flow generator 3, a main switch valve 6 is disposed between the compressed air supply line 2 and the compressed air flow generator 3, which connects the compressed air flow generator 3 to the compressed air supply line 2 in the open state and disconnects said generator from said line in the closed state. The pneumatic vane motor 7 of the hoist 1 is connected in parallel to the compressed air flow generator 3 and can also be disconnected from the compressed air supply line 2 by means of the main switch valve 6.

For operating the hoist 1, compressed air is first applied to the compressed air supply line 2, but it does not yet reach the hoist 1 since the main switch valve 6 is closed. However, the compressed air already reaches the pneumatic hand control 5 via a fluid control line 8 disposed upstream of the main switch valve 6, such that compressed air is also applied to there.

Now, when one of the actuation buttons 13 is pressed, compressed air is introduced into one of the control lines 11, 12 for lifting or lowering the hoist 1, by which the compressed air first reaches a shuttle valve 15, by which the main switch valve 6 is opened.

Subsequently, part of the compressed air inside the hoist 1 flows into a supply air line 14 to the compressed-air generator 3, which immediately starts generating electricity.

At the same time, pressure builds up inside the hoist 1 upstream of the switching valves 9, 10, which, however, cannot yet open during the pressure buildup. During this time, the compressed-air generator 3 is already providing electricity to the connected electrical consumers 4, for example a control and evaluation unit, so that these can start.

As soon as a sufficiently high pressure is applied to the switching valves 9, 10, they can be opened and the vane motor 7 of the hoist 1 moves in the desired direction. In this case, the pressure increase as well as the starting process of the electrical consumers 4 typically takes between 50 ms and 150 ms. In addition, the starting process can also last longer, although a duration of less than 500 ms is clearly preferred.

During operation of the hoist 1, all electrical consumers 4 are supplied by means of the compressed-air generator 3, wherein preferably a temporary power storage is provided, for example a capacitor, to bridge fluctuations and short interruptions. In addition, a long-life battery can be provided on an electrical consumer 4, for example to enable operation of a real-time clock as part of an operating hour counter.

LIST OF REFERENCE SIGNS

1 Hoist
2 Fluid supply line
3 Generator
4 Consumer
5 pneumatic hand control
6 Main switch valve
7 Motor
8 Fluid control line
9 Switching valve "Lifting"
10 Switching valve "Lowering"
11 Control line "Lifting"
12 Control line "Lowering"
13 Actuation button
14 Supply air line to the generator
15 Shuttle valve

The invention claimed is:

1. A compressed air-operated hoist, comprising a fluid supply line supplying compressed air to the hoist for operating the hoist, a compressed air generator connected to the fluid supply line for generating electricity by means of the compressed air, and at least one electrical consumer on the hoist, which is operated by the electricity generated by the compressed air generator.

2. The compressed air-operated hoist according to claim 1, wherein an electrical consumer is a receiver unit of a wireless remote control of the hoist, an electronic control unit, an operating hour counter and/or an evaluation unit for determining operating states of the hoist.

3. The compressed air-operated hoist according to claim 1, wherein an accumulator for storing the electricity generated by means of the compressed air generator and/or for operating at least one electrical consumer while the compressed air generator is not generating electricity.

4. The compressed air-operated hoist according to claim 1, wherein a wired hand control for operating at least one electro-pneumatic valve of the hoist, said valve being supplied with electricity by the compressed air generator.

5. The compressed air-operated hoist according to claim 1, wherein a pneumatic hand control, at which in the ready-for-operation condition of the hoist a fluid pressure is always applied, wherein by means of the hand control a main switch valve of the fluid supply line can be opened, such that the compressed air is supplied to the compressed air generator for generating electricity and/or to a motor of the hoist.

6. The compressed air-operated hoist according to claim 1, wherein a main switch valve and/or a fluid pressure sensor are disposed between the fluid supply line supplying the compressed air to the hoist and the compressed air generator connected to the fluid supply line.

7. The compressed air-operated hoist according to claim 1, wherein the compressed air generator and a motor of the hoist are connected to the fluid supply line in parallel with and/or inseparably from each other, wherein a main switch valve is disposed between a fluid control line to a hand control and the compressed air generator and/or the motor of the hoist.

8. The compressed air-operated hoist according to claim 1, wherein a control unit interpolates a starting time on the basis of the current rotational speed of a starting motor of the hoist when the motor has started before the at least one electrical consumer is fully started or ready for operation.

9. A method for operating a compressed air-operated hoist, comprising the steps of:

supplying compressed air as an operating fluid to the hoist via a fluid supply line, supplying the operating fluid to a compressed air generator of the hoist and generating electricity by means of the compressed air, and conducting the generated electricity to at least one electrical consumer of the hoist.

10. The method for operating a compressed air-operated hoist according to claim 9, wherein, when a main switch valve disposed between the fluid supply line and a motor of the hoist is opened, the compressed air generator is automatically supplied with compressed air, such that electricity for at least one electrical consumer is generated.

11. The method for operating a compressed air-operated hoist according to claim 9, wherein when an actuation button on a pneumatic hand control is pressed, a main switch valve is opened and/or the compressed air generator is supplied with compressed air.

12. The method for operating a compressed air-operated hoist according to claim 9, wherein, after opening a main switch valve, a fluid pressure is continuously built up upstream of a motor control valve for lifting or lowering by the hoist, while the compressed air generator is already supplied with compressed air, wherein the at least one electrical consumer is fully started until the fluid pressure is sufficiently high to open the motor control valve.

13. The method for operating a compressed air-operated hoist according to claim 9, wherein a control unit interpolates a starting time on the basis of the current rotational speed of a starting motor of the hoist when the motor has started before the at least one electrical consumer is fully started or ready for operation.

14. The method for operating a compressed air-operated hoist according to claim 9, wherein at least one electrical consumer is started as soon as the compressed air generator generates electricity, wherein a control unit, which does not start the respective at least one electrical consumer until the electricity required for this purpose is available, is provided.

15. The method for operating a compressed air-operated hoist according to claim 9, wherein, if no operating fluid pressure is applied, the at least one electrical consumer is completely switched off after a set time interval and/or a main switch valve disposed between the fluid supply line and the compressed air generator is automatically closed.

16. A method for operating a compressed air-operated hoist, comprising the steps of:

supplying compressed air as an operating fluid to the hoist via a fluid supply line;

supplying the operating fluid to a compressed air generator of the hoist and generating electricity by means of the compressed air;

conducting the generated electricity to at least one electrical consumer of the hoist; and interpolating a starting time based on the current rotational speed of a starting motor of the hoist when the motor has started.

* * * * *